(12) United States Patent
Ino et al.

(10) Patent No.: US 9,432,673 B2
(45) Date of Patent: Aug. 30, 2016

(54) IMAGE PROCESSING DEVICE, IMAGE PROCESSING SYSTEM, IMAGE PROCESSING METHOD AND PROGRAM

(75) Inventors: Takao Ino, Kanagawa (JP); Takashi Kataigi, Tokyo (JP); Masanobu Nishimura, Tokyo (JP)

(73) Assignee: Sony Corporation, Tokyo (JP)

( * ) Notice: Subject to any disclaimer, the term of this patent is extended or adjusted under 35 U.S.C. 154(b) by 1117 days.

(21) Appl. No.: 13/137,772

(22) Filed: Sep. 12, 2011

(65) Prior Publication Data

US 2012/0092506 A1    Apr. 19, 2012

(30) Foreign Application Priority Data

Oct. 18, 2010 (JP) ................................. 2010-233320

(51) Int. Cl.
| | |
|---|---|
| H04N 5/232 | (2006.01) |
| H04N 19/136 | (2014.01) |
| H04N 19/146 | (2014.01) |
| H04N 21/462 | (2011.01) |
| H04N 19/15 | (2014.01) |

(52) U.S. Cl.
CPC ............ *H04N 19/146* (2014.11); *H04N 5/232* (2013.01); *H04N 19/136* (2014.11); *H04N 19/15* (2014.11); *H04N 21/4621* (2013.01)

(58) Field of Classification Search
USPC .............................. 348/207.1, 222.1; 382/232
See application file for complete search history.

(56) References Cited

U.S. PATENT DOCUMENTS

| | | | | |
|---|---|---|---|---|
| 6,492,982 | B1* | 12/2002 | Matsuzaki | G09G 5/006 345/204 |
| 6,700,607 | B1* | 3/2004 | Misawa | 348/230.1 |
| 2005/0201537 | A1* | 9/2005 | Honda | G06F 13/4291 379/100.17 |
| 2008/0043891 | A1* | 2/2008 | Iga | H04N 1/32448 375/354 |
| 2009/0047001 | A1* | 2/2009 | Kojima | 386/124 |
| 2010/0290522 | A1* | 11/2010 | Otani | H04L 1/0014 375/240.02 |
| 2010/0328514 | A1* | 12/2010 | Hosoe | G06F 17/30274 348/333.05 |
| 2011/0025869 | A1* | 2/2011 | Lee | 348/222.1 |

FOREIGN PATENT DOCUMENTS

JP    2008-092292    4/2008

\* cited by examiner

*Primary Examiner* — Twyler Haskins
*Assistant Examiner* — Akshay Trehan
(74) *Attorney, Agent, or Firm* — Chip Law Group

(57) ABSTRACT

Disclosed herein is an image processing device including: an acquisition section adapted to acquire coded data and control the output or recording of the coded data; a generation section adapted to generate image data; a coding section adapted to generate the coded data by coding the generated image data in response to an output request from the acquisition section; an output section adapted to output the generated coded data to the acquisition section; and a control section adapted to determine, based on the generated coded data, the sizes of vertical and horizontal synchronizing signals used to output the coded data to the acquisition section, notify the determined sizes to the acquisition section, and control the output section to output the coded data according to the vertical and horizontal synchronizing signals of the determined sizes after the notification.

17 Claims, 11 Drawing Sheets

FIG.11

| ID NO. | HORIZONTAL SYNCHRONIZING SIGNAL (HSYNC) | VERTICAL SYNCHRONIZING SIGNAL (VSYNC) |
|---|---|---|
| 1 | 4000 | 1000 |
| 2 | 4000 | 2000 |
| 3 | 4000 | 3000 |
| 4 | 4000 | 4000 |

IMAGE PROCESSING DEVICE, IMAGE PROCESSING SYSTEM, IMAGE PROCESSING METHOD AND PROGRAM

BACKGROUND

The present disclosure relates to an image processing device, and more particularly, to an image processing device and image processing system for handling still image data, an image processing method used thereby and a program for causing a computer to execute the image processing method.

Recent years have seen widespread use of imaging devices such as digital still camera and digital video camera (e.g., camcorder) adapted to generate image data by capturing images of a subject such as a person or scenery and recording the generated image data as image content (image file).

On the other hand, image processing devices such as mobile phone devices are widely available that have a camera module (e.g., imaging device) adapted to generate image data and that are capable of handling generated image data. In such a mobile phone device, image data generated by the camera module is output to the host of the mobile phone device so that the output and recording of the image data are controlled by the host.

For example, the following mobile phone device is proposed (refer, for example, to Japanese Patent Laid-Open No. 2008-92292 (FIG. 5)). That is, the transmitting side transmits JPEG (Joint Photographic Experts Group) data at a fixed data size by attaching invalid data. The receiving side extracts the JPEG data by removing the invalid data from the JPEG data.

SUMMARY

The above related art allows for a system supporting the YUV format to transmit JPEG data of a variable length. It should be noted, however, that if invalid data is attached to JPEG data to transform the data to a fixed length, it takes the same amount of time to transmit the entire data regardless of the size of the JPEG data.

Here, the number of pixels in the imaging element of the camera module is showing an increasing trend in recent years. As a result, the size of image data that can be handled by image processing devices such as mobile phone devices having a camera module has been increasing. For example, image data generated by a camera module is possibly handled "as is" without being reduced in size for recording purposes or is reduced in size so that it can be attached to e-mail.

With the above related art, however, it takes the same amount of time to transmit the data regardless of the size of the coded data. For example, therefore, coded data of a small size is transmitted for the same amount of time as coded data of a large size. Therefore, if coded data of a small size is transmitted successively, for example, the transmission time is comparatively long for its size. Therefore, it is important to transmit coded data efficiently according to the data size.

The present disclosure has been made in light of the foregoing, and it is desirable to transmit coded data efficiently.

According to a first mode of the present disclosure, there are provided an image processing device, an image processing method used thereby and a program for causing a computer to execute the image processing method. The image processing device includes an acquisition section, generation section, coding section, output section and control section. The acquisition section acquires coded data and controls the output or recording of the coded data. The generation section generates image data. The coding section generates the coded data by coding the generated image data in response to an output request from the acquisition section. The output section outputs the generated coded data to the acquisition section. The control section determines, based on the generated coded data, the sizes of vertical and horizontal synchronizing signals used to output the coded data to the acquisition section, notifies the determined sizes to the acquisition section, and controls the output section to output the coded data according to the vertical and horizontal synchronizing signals of the determined sizes after the notification. This makes it possible to determine, based on the generated coded data, the sizes of the vertical and horizontal synchronizing signals used to output the generated coded data to the acquisition section in response to an output request therefrom, notify the determined sizes to the acquisition section, and output the generated coded data according to the vertical and horizontal synchronizing signals of the determined sizes after the notification.

Alternatively, in the first mode, the generation section may generate the image data by capturing an image of a subject. This makes it possible to generate image data by capturing an image of the subject.

Still alternatively, in the first mode, the generation section may generate a plurality of pieces of image data that are successive in time series by continuously capturing images of the subject, and the coding section may generate the plurality of pieces of coded data by sequentially coding the plurality of pieces of generated image data. The control section may determine the sizes of the vertical and horizontal synchronizing signals for each piece of the generated coded data, notify the determined sizes for each piece of the generated coded data to the acquisition section and control the output of each piece of the coded data to the acquisition section according to the vertical and horizontal synchronizing signals of the notified sizes. This makes it possible to generate a plurality of pieces of image data that are successive in time series by continuously capturing images of the subject, generate a plurality of pieces of coded data by sequentially coding the plurality of pieces of generated image data, notify the determined sizes to the acquisition section, and control the output of each piece of the coded data to the acquisition section according to the vertical and horizontal synchronizing signals of the notified sizes.

Still alternatively, in the first mode, the coding section may generate the coded data by coding the generated image data according to the JPEG scheme. This makes it possible to generate coded data by coding image data according to the JPEG scheme.

Still alternatively, in the first mode, the coding section may generate coded data for a main image making up a JPEG file and coded data for a thumbnail image making up the JPEG file based on the generated image data. The control section may determine the sizes of the vertical and horizontal synchronizing signals for each piece of the coded data making up the JPEG file, notify the determined sizes for each piece of the coded data to the acquisition section and control the output of each piece of the coded data to the acquisition section according to the vertical and horizontal synchronizing signals of the notified sizes. This makes it possible to generate coded data for main and thumbnail images making up a JPEG file, determine the sizes of the vertical and horizontal synchronizing signals for each piece of the coded data for the main and thumbnail images making up the JPEG file, notify the determined sizes for each piece of the coded data to the acquisition section, and control the output of each piece of the coded data to the acquisition section according to the vertical and horizontal synchronizing signals of the notified sizes.

Still alternatively, in the first mode, the control section may determine, of all the sizes of the vertical and horizontal synchronizing signals at which the amount of data identified by the sizes of the vertical and horizontal synchronizing signals is equal to or greater than that of the generated coded data, the combination of the smallest sizes. This makes it possible to determine, of all the sizes of the vertical and horizontal synchronizing signals at which the amount of data identified by the sizes of the vertical and horizontal synchronizing signals is equal to or greater than that of the generated coded data, the combination of the smallest sizes.

Still alternatively, in the first mode, the image processing device may further include an invalid data attachment section adapted to attach invalid data to the generated coded data so as to bring the amount of data into equality with that identified by the determined sizes. The control section may control the output section to output the generated output data according to the determined sizes after the notification. This makes it possible to generate output data by attaching invalid data to generated coded data so as to bring the amount of data into equality with that identified by the determined sizes and output the generated output data according to the determined sizes after the notification of the determined sizes.

Still alternatively, in the first mode, the image processing device may further include a storage section adapted to store a plurality of combinations of the sizes of the vertical and horizontal synchronizing signals. The control section may determine, of all the combinations of sizes at which the amount of data identified by the combination of sizes is equal to or greater than that of the generated coded data, the sizes whose combination provides the smallest identified amount of data. This makes it possible to determine, of all the combinations of sizes at which the amount of data identified by the combination of sizes is equal to or greater than that of the generated coded data, the sizes whose combination provides the smallest identified amount of data.

Still alternatively, in the first mode, the control section may determine a fixed size as the size of the horizontal synchronizing signal and a size commensurate with the amount of the generated coded data as the size of the vertical synchronizing signal. This makes it possible to determine a fixed size as the size of the horizontal synchronizing signal and a size commensurate with the amount of the generated coded data as the size of the vertical synchronizing signal.

According to a second mode of the present disclosure, there are provided an image processing system, an image processing method used thereby and a program for causing a computer to execute the image processing method. The image processing system includes an image processing device. The image processing device includes an acquisition device, generation section, coding section, output section and control section. The acquisition device acquires coded data and controls the output or recording of the coded data. The generation section generates image data. The coding section generates the coded data by coding the generated image data in response to an output request from the acquisition device. The output section outputs the generated coded data to the acquisition device. The control section determines, based on the generated coded data, the sizes of vertical and horizontal synchronizing signals used to output the coded data to the acquisition device, notifies the determined sizes to the acquisition device, and controls the output section to output the coded data according to the vertical and horizontal synchronizing signals of the determined sizes after the notification. This makes it possible to determine, based on the generated coded data, the sizes of the vertical and horizontal synchronizing signals used to output the generated coded data to the acquisition device in response to an output request therefrom, notify the determined sizes to the acquisition device, and output the generated coded data according to the vertical and horizontal synchronizing signals of the determined sizes after the notification.

The present disclosure allows for efficient transmission of coded data.

BRIEF DESCRIPTION OF THE DRAWINGS

FIG. 11 is a diagram illustrating an example of a synchronizing signal length indication information table stored in the host and camera module in a second embodiment of the present disclosure.

DETAILED DESCRIPTION OF THE PREFERRED EMBODIMENTS

A description will be given below of the modes (hereinafter referred to as the embodiments) for carrying out the present disclosure. The description will be given in the following order.

1. First embodiment (transmission control: example in which, during transmission of coded data to a host from a camera module, the camera module notifies the lengths of synchronizing signals to the host based on the coded data first and then transmits the coded data in synchronism with the synchronizing signals)

2. Second embodiment (transmission control: example in which a plurality of combinations of lengths of synchronizing signals are stored and the lengths of the synchronizing signals in one of the combinations are notified)

<1. First Embodiment>

[System Configuration Example of the Mobile Phone Device]

Figure 1:
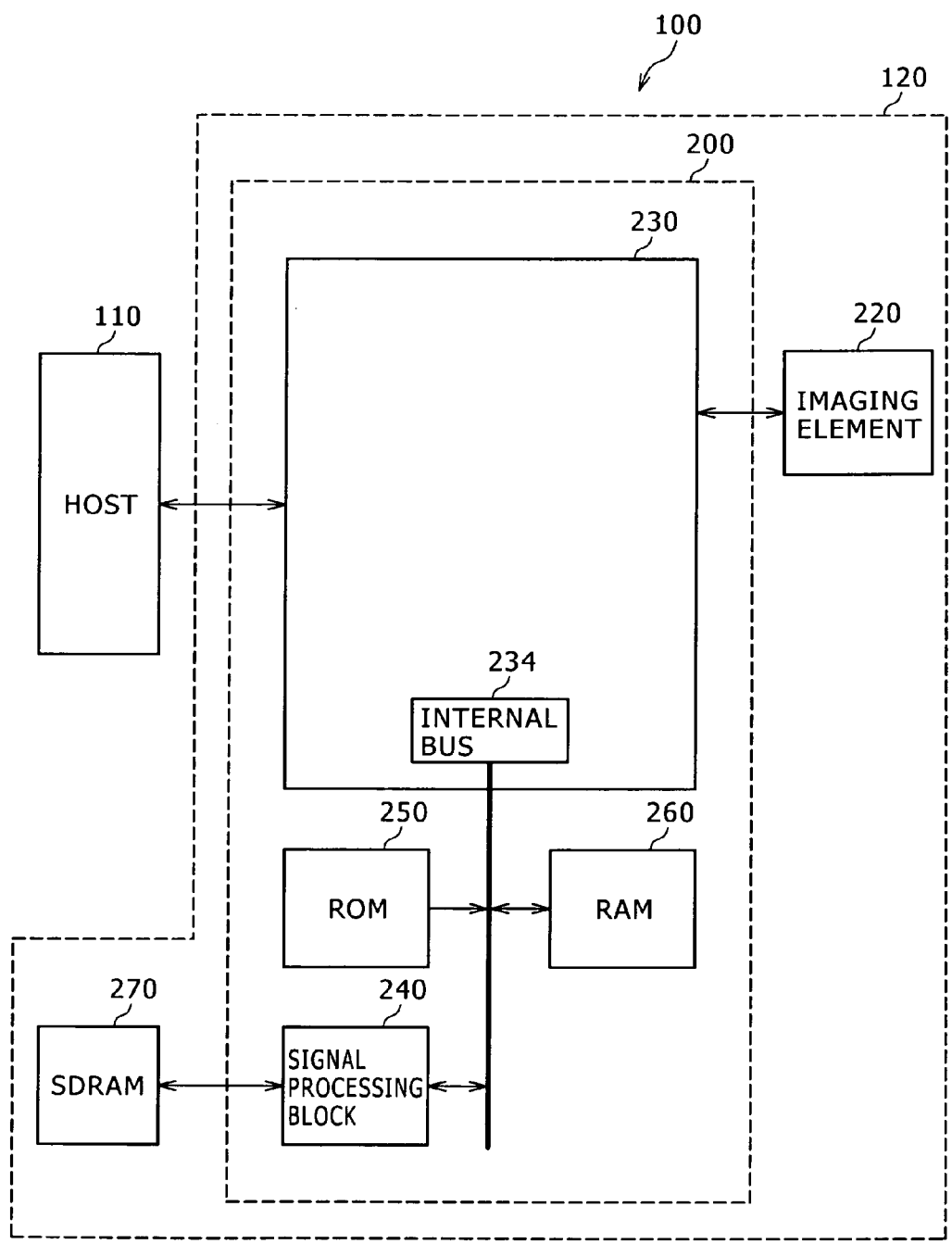
FIG. 1 is a block diagram illustrating a system configuration example of a mobile phone device in a first embodiment of the present disclosure.

FIG. 1 is a block diagram illustrating a system configuration example of a mobile phone device 100 in a first embodiment of the present disclosure. The mobile phone device 100 includes a host 110 and camera module 120. Thus, the mobile phone device 100 can be broadly divided into two parts, the host (receiver) and camera module (transmitter). Further, the camera module 120 includes a DSP (Digital Signal Processor) 200, imaging element 220 and SDRAM (Synchronous Dynamic Random Access Memory) 270. It should be noted that, in FIG. 1, the illustration and description of other components of the mobile phone device 100 (e.g., analog signal processing block and A/D (Analog/Digital) conversion block between the imaging element 220 and DSP 200) are omitted. On the other hand, the mobile phone device 100 is an example of the image processing device and image processing system as defined in the appended claims.

The host 110 is the counterpart of the CPU (Central Processing Unit) of the mobile phone device. For example, the host 110 acquires coded data (final output data) from the camera module 120 and controls the output or recording of the coded data. Further, the host 110 engages in I²C (Inter-Integrated Circuit) communication with a CPU 230 incorporated in the DSP 200, thus exchanging commands and responses with the CPU 230. The commands are issued, for example, to specify imaging conditions and instruct the start of imaging. It should be noted that the host 110 is an example of the acquisition section and acquisition device as defined in the appended claims.

The imaging element 220 converts light supplied from an optics 210 (shown in FIG. 4) into an electric charge, thus accumulating the pixel charge produced by photoelectric conversion and outputting the accumulated charge to the signal processing block 240 in the form of an image signal (image data). Further, for example, the imaging element 220 controls the exposure time, switches between global shutter modes and performs a global reset at a specified timing under control of the CPU 230 through I²C communication. The imaging element 220 generates image data by capturing an image of the subject, for example, when an instruction is output from the CPU 230 to initiate the imaging operation. Further, the imaging element 220 generates a plurality of pieces of image data that are successive in time series by continuously capturing images of the subject when an instruction is output from the CPU 230 to initiate the continuous imaging operation (so-called continuous shooting). A CCD (Charge Coupled Device) or CMOS (Complementary Metal Oxide Semiconductor) can be, for example, used as the imaging element 220. It should be noted that the imaging element 220 is an example of the generation section as defined in the appended claims.

The DSP 200 includes the CPU 230, signal processing block 240, a ROM (Read Only Memory) 250 and RAM (Random Access Memory) 260 that are connected to each other by an internal bus 234. More specifically, the DSP 200 performs a variety of image processing tasks on an image signal (image data) supplied from the imaging element 220 under control of the host 110.

The CPU 230 executes the program stored in the ROM 250. The CPU 230 is an example of the control section as defined in the appended claims.

The signal processing block 240 is connected to the SDRAM 270 and performs camera signal processing on image signals (image data) supplied from the imaging element 220 under control of the CPU 230.

The ROM 250 is a memory adapted to store the program or the like executed by the CPU 230.

The RAM 260 is a memory adapted to temporally store various results of arithmetic operations.

The SDRAM 270 is a temporary storage area adapted to store image data such as pixel-by-pixel image signal (image data) read from the imaging element 220 and results of signal processing performed by the signal processing block 240.

[Example of Image Processing of Image Data]

Figure 2:
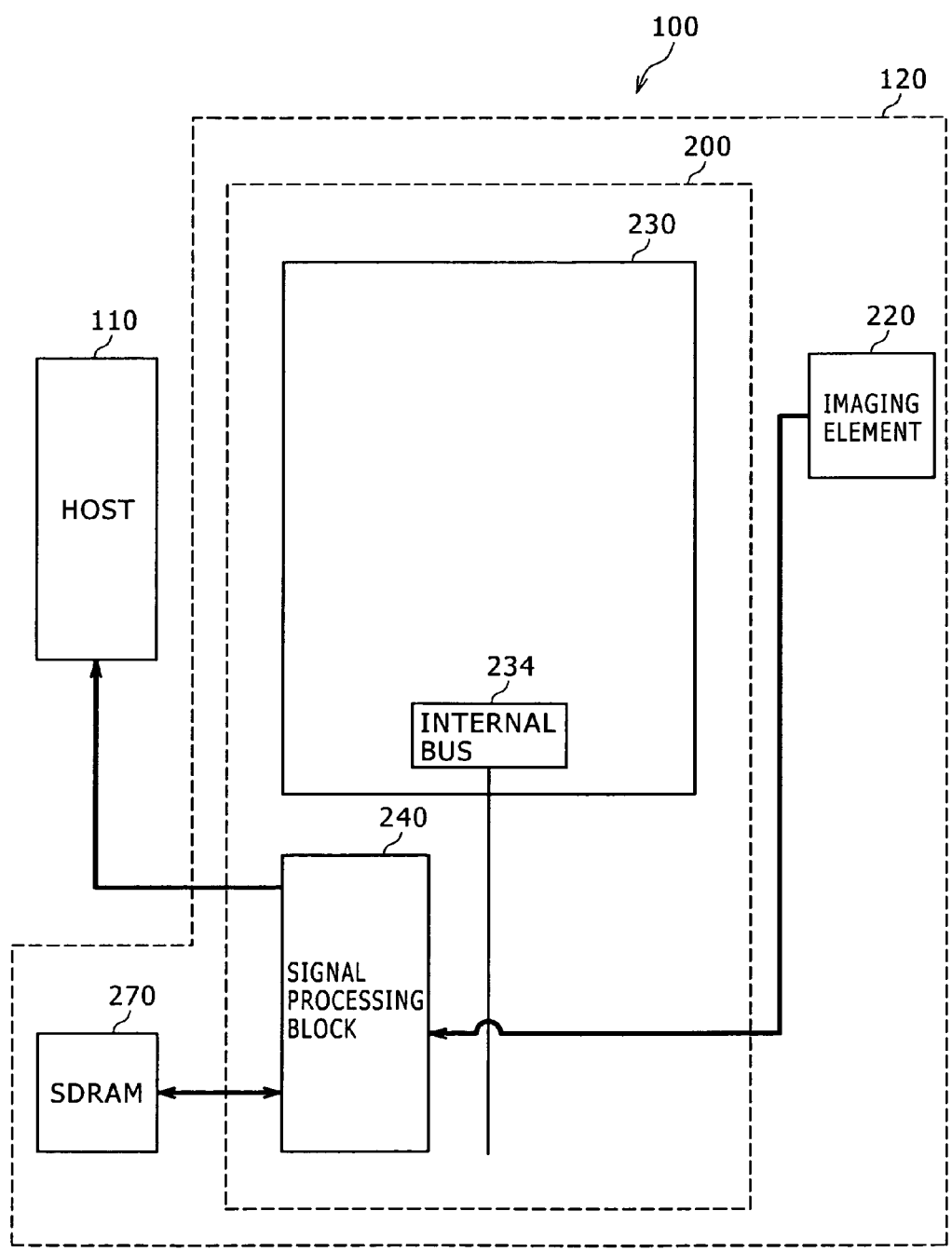
FIG. 2 is a diagram schematically illustrating the flow of an image signal generated by an imaging element in the first embodiment of the present disclosure.

FIG. 2 is a diagram schematically illustrating the flow of an image signal (image data) generated by the imaging element 220 in the first embodiment of the present disclosure. Here, of all the sections shown in FIG. 1, only those sections primarily handling image processing of an image signal are shown in FIG. 2, and other sections are not shown. Further, a bold line arrow schematically illustrates the flow of the image signal generated by the imaging element 220.

As illustrated in FIG. 2, the image signal (pixel-by-pixel image signal) output from the imaging element 220 is supplied to the signal processing block 240. Next, the signal processing block 240 stores the image signal supplied from the imaging element 220 in the SDRAM 270, thus performing a variety of image processing tasks on the image signal. Then, the image signal stored in the SDRAM 270 after having been subjected to a variety of image processing tasks is processed again by the signal processing block 240 to suit the output format and output to the host 110.

[Example of Calculating the Amount of Output Data]

Figure 3:
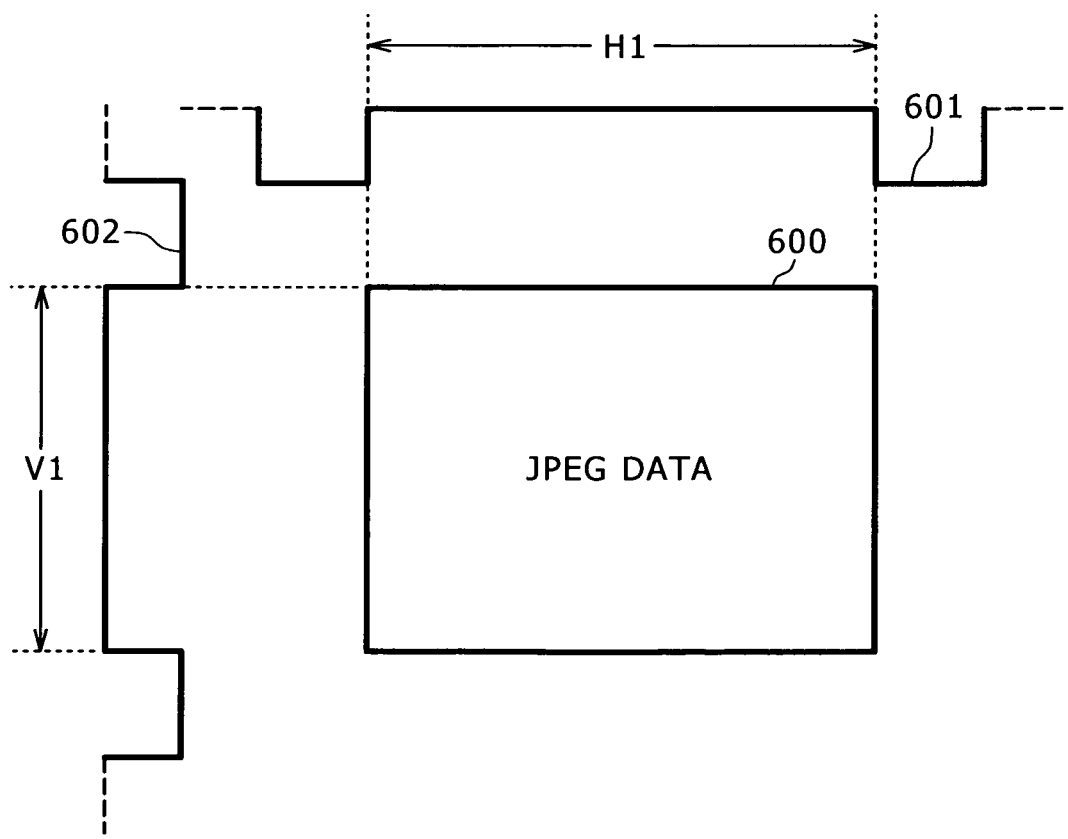
FIG. 3 is a diagram schematically illustrating image data output to a host from a signal processing block in the first embodiment of the present disclosure.

FIG. 3 is a diagram schematically illustrating image data output to the host 110 from the signal processing block 240 in the first embodiment of the present disclosure. Here, in the first embodiment of the present disclosure, an example is shown in which image data in JPEG (Joint Photographic Experts Group) format is used as image data output to the host 110 from the signal processing block 240. JPEG data is image data (coded data) coded (compression-coded) according to the JPEG coding scheme (compression coding scheme). FIG. 3 schematically illustrates JPEG data 600 in a rectangular form. Further, FIG. 3 describes how to calculate the data amount (amount of output data) by referring to the JPEG data 600 when coded data is output.

In FIG. 3, the horizontal axis represents a horizontal synchronization period H1 of a horizontal synchronizing signal (HSYNC) 601, and the vertical axis represents a vertical synchronization period V1 of a vertical synchronizing signal (VSYNC) 602.

A description will be given here of the amount of output data. The amount of output data is a value defined by the horizontal data count multiplied by the vertical line count. That is, the amount of output data is determined by the product of the number of pieces of data in the horizontal synchronization period of the horizontal synchronizing signal (HSYNC) and the number of lines in the vertical synchronization period of the vertical synchronizing signal (VSYNC). For example, if there are 1024 data clocks in the horizontal synchronization period H1 of the horizontal synchronizing signal (HSYNC) 601 and if one data clock is equal to one byte, there is one Kbyte of data per line. In this case, if there are 1024 lines in the vertical synchronization period V1 of the vertical synchronizing signal (VSYNC) 602, there is one Mbyte of data that can be output. Therefore, if there are 1024 data clocks of data in the horizontal synchronization period H1 and if there are 1024 lines in the vertical synchronization period V1, the amount of output data at the time of output of coded data is one Mbyte.

[Functional Configuration Example of the Mobile Phone Device]

Figure 4:
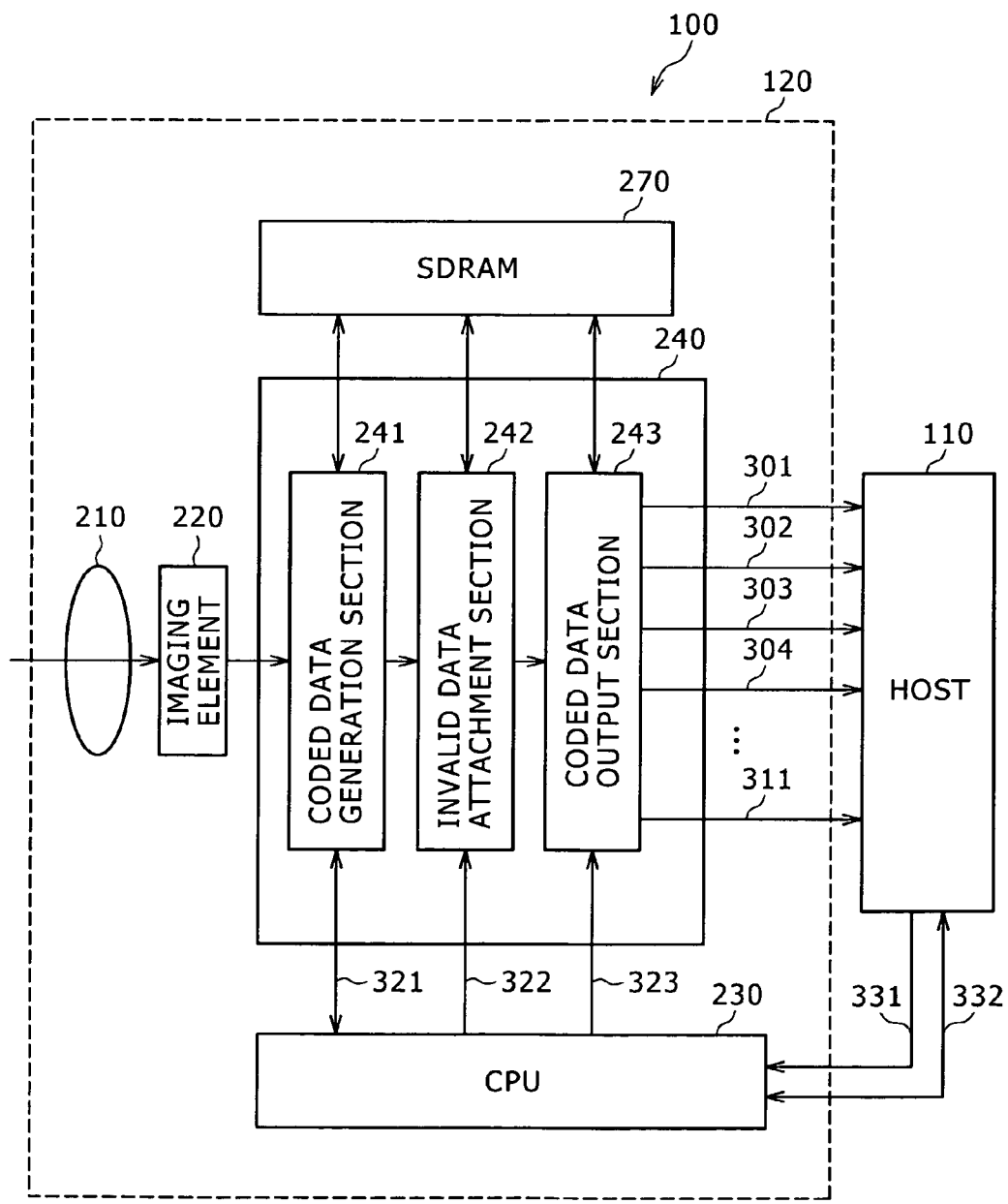
FIG. 4 is a block diagram illustrating a functional configuration example of the mobile phone device in the first embodiment of the present disclosure.

FIG. 4 is a block diagram illustrating a functional configuration example of the mobile phone device 100 in the first embodiment of the present disclosure. Here, of all the sections shown in FIG. 1, only those sections primarily handling signal processing are shown in FIG. 4, and other sections are not shown. The mobile phone device 100 includes the host 110, optics 210, imaging element 220, CPU 230, signal processing block 240, SDRAM 270 and signal lines 301 to 311, 321 to 323 and 331 and 332. It should be noted that, of the signal lines 301 to 311, the lines 305 to 310 are not shown. On the other hand, the signal processing block 240 includes a coded data generation section 241, invalid data attachment section 242 and coded data output section 243.

A description will be given here of the flow of image data in the signal processing block 240. First, image data (image signal) generated by the imaging element 220 is supplied to the signal processing block 240 and stored in the SDRAM 270. In this case, for example, each of the coded data generation section 241, invalid data attachment section 242 and coded data output section 243 can directly read the image data from the SDRAM 270 and sequentially write the processed image data to the SDRAM 270. Alternatively, for example, each of the invalid data attachment section 242 and coded data output section 243 may receive image data from the processing section at the previous stage and pass the processed image data to the processing section at the subsequent stage. In order to facilitate the description, we assume below that image data is output from the processing section at the previous stage to that at the subsequent stage.

The signal lines 301 to 311 are eleven (11) parallel signal lines. More specifically, the signal line 301 is a signal line adapted to output data clocks (DCK) of a digital video signal. Further, the signal line 302 is a signal line adapted to output a horizontal synchronizing signal (HSYNC), and the signal line 303 a vertical synchronizing signal (VSYNC). Still further, the signal lines 304 to 311 are signal lines adapted to output a digital video signal. That is, the signal line 304 is a signal line adapted to output the digital video signal for the zeroth bit. The signal line 305 (not shown) is a signal line adapted to output the digital video signal for the first bit. Similarly, the signal lines 306 to 310 (not shown) are signal lines adapted to output the digital video signals for the second to sixth bits. Further, the signal line 311 is a signal line adapted to output the digital video signal for the seventh bit.

The signal lines 321 to 323 are control lines used by the CPU 230 to output control signals to the different sections (coded data generation section 241, invalid data attachment section 242 and coded data output section 243) of the signal processing block 240. Further, information about coded data is output to the CPU 230 from the coded data generation section 241 via the signal line 321.

The signal lines 331 and 332 are signal lines ($I^2C$ (control lines)) adapted to allow for the host 110 (control side (master)) and CPU 230 to communicate with each other. More specifically, the signal line 331 is a serial clock line (SCL) to achieve synchronization. That is, the signal line 331 is a unidirectional signal line from the host 110 to the CPU 230. On the other hand, the signal line 332 is a serial data line (SDA) used for data transfer between the host 110 and CPU 230. This signal line 332 is a bidirectional signal line whose directions of input and output change depending on transmission or reception. For example, if requested to output coded data by the host 110, the CPU 230 outputs a control signal to the different sections of the signal processing block 240 in response to this output request.

The optics 210 includes a plurality of lenses and an aperture to collect light from a subject and supply the collected light to the imaging element 220 via the aperture.

The coded data generation section 241 converts image data (image signal) supplied from the imaging element 220 into coded data according to the JPEG coding scheme under control of the CPU 230. The same section 241 outputs the coded data to the invalid data attachment section 242. Further, the coded data generation section 241 outputs the amount of coded data to the CPU 230 via the signal line 321. The CPU 230 determines the lengths (sizes) of the synchronizing signals (vertical and horizontal synchronizing signals) for the coded data based on the amount of coded data output from the coded data generation section 241. Then, the CPU 230 calculates the amount of data (amount of output data) at the time of output of the coded data based on the determined lengths of the synchronizing signals, outputting the amount of output data to the invalid data attachment section 242 via the signal line 322. Further, the CPU 230 outputs the determined lengths of the synchronizing signals to the coded data output section 243 via the signal line 323 and to the host 110 via the signal line 332.

That is, the CPU 230 determines, based on generated coded data, the lengths (sizes) of the synchronizing signals (vertical and horizontal synchronizing signals) used to output the generated coded data to the host 110. In this case, the CPU 230 determines, of all the lengths of the vertical and horizontal synchronizing signals at which the amount of data identified by the sizes of the vertical and horizontal synchronizing signals is equal to or greater than that of the generated coded data, the combination of the smallest sizes. For example, it is possible to specify combinations of lengths of the vertical and horizontal synchronizing signals in advance and select the lengths of the synchronizing signals used to output coded data to the host 110 from among the specified combinations. For example, the following four combinations ((1) to (4)) are specified as available combinations of lengths of the vertical synchronizing signal (VSYNC) and horizontal synchronizing signal (HSYNC).

(1) HSYNC=4000, VSYNC=1000
(2) HSYNC=4000, VSYNC=2000
(3) HSYNC=4000, VSYNC=3000
(4) HSYNC=4000, VSYNC=4000

Then, for example, if the amount of generated coded data is 4,000,000 or less, the CPU 230 selects the combination (1), and if the amount of generated coded data is greater than 4,000,000 and 8,000,000 or less, the CPU 230 selects the combination (2). Similarly, if the amount of generated coded data is greater than 8,000,000 and 12,000,000 or less, the CPU 230 selects the combination (3), and if the amount of generated coded data is greater than 12,000,000 and 16,000,000 or less, the CPU 230 selects the combination (4). That is, the smallest lengths of the synchronizing signals (vertical and horizontal synchronizing signals) that can output the amount of generated coded data are selected. Further, if the combination (1) is selected, the CPU 230 calculates the amount of output data to be 4,000,000, and if the combination (2) is selected, the CPU 230 calculates the amount of output data to be 8,000,000. Similarly, if the combination (3)

is selected, the CPU 230 calculates the amount of output data to be 12,000,000, and if the combination (4) is selected, the CPU 230 calculates the amount of output data to be 16,000,000. It should be noted that although a case was shown in which a single optimal combination was selected from among a plurality of preset combinations, the lengths of the vertical and horizontal synchronizing signals may be determined by calculating the lengths appropriate to the amount of generated coded data. Further, although a case was shown in this example in which the length of the horizontal synchronizing signal is fixed, the length thereof may be changed based on the amount of generated coded data if it is permitted to do so. Further, the CPU 230 notifies the determined lengths of the synchronizing signals to the host 110. It should be noted that the coded data generation section 241 is an example of the coding section as defined in the appended claims.

The invalid data attachment section 242 attaches invalid data to the coded data output from the coded data generation section 241 under control of the CPU 230, outputting the coded data with the invalid data to the coded data output section 243. Here, the term "invalid data" refers to data that can be detected by the host 110 as invalid data. For example, invalid data can be attached by recording some kind of data (invalid data) after the end marker (EOI (End of Image)) defined in the JPEG format. Further, a "reservation code" or "prohibition code" defined in the JPEG format may be, for example, used as invalid data.

More specifically, the invalid data attachment section 242 compares the amount of coded data output from the coded data generation section 241 and the amount of output data output from the CPU 230 to determine whether the two data amounts are the same. Then, if the amount of coded data is not the same as the amount of output data, the invalid data attachment section 242 attaches invalid data to the coded data, thus bringing the sum of the coded data and invalid data into equality with the amount of output data. That is, the invalid data attachment section 242 attaches invalid data to the coded data so that the sum of the coded data and invalid data is equal to the amount of data (amount of output data) identified by the lengths of the synchronizing signals determined by the CPU 230. On the other hand, when the amount of coded data is the same as the amount of output data, the invalid data attachment section 242 does not attach any invalid data to the coded data. In this case, the coded data is output without any invalid data to the coded data output section 243. Here, the data (coded data) output from the invalid data attachment section 242 is considered as final output data.

The coded data output section 243 outputs final output data output from the invalid data attachment section 242 based on the lengths of the synchronizing signals (vertical and horizontal synchronizing signals) output from the CPU 230 under control of the CPU 230. More specifically, the coded data output section 243 generates vertical and horizontal synchronizing signals appropriate to the lengths of the synchronizing signals output from the CPU 230, outputting the generated horizontal synchronizing signal to the signal line 302 and the generated vertical synchronizing signal to the signal line 303. Further, the coded data output section 243 outputs the final output data to the signal lines 304 to 311 in synchronism with the generated vertical and horizontal synchronizing signals. That is, the CPU 230 controls, after the notification of the lengths of the determined synchronizing signals, the coded data output section 243 to output the final output data according to the determined vertical and horizontal synchronizing signals. It should be noted that the coded data output section 243 is an example of the output section as defined in the appended claims.

On the other hand, the host 110 captures the final output data output from the coded data output section 243 according to the lengths of the synchronizing signals notified by the CPU 230. That is, the host 110 captures the final output data output from the coded data output section 243 in synchronism with the vertical and horizontal synchronizing signals output from the coded data output section 243 via the signal lines 302 and 303. Then, after capturing the final output data, the host 110 detects the invalid data attached to the final output data and removes the invalid data from the final output data, thus extracting only the coded data. Further, the host 110 exercises control so that the extracted coded data is recorded to a recording media (not shown) as still image content. Still further, the host 110 performs display control so that the still image content recorded in the recording media is displayed on a display section (not shown) or performs output control so that the still image content is output to external equipment.

[Example of Communication between the Host and Camera Module]

Figure 5:
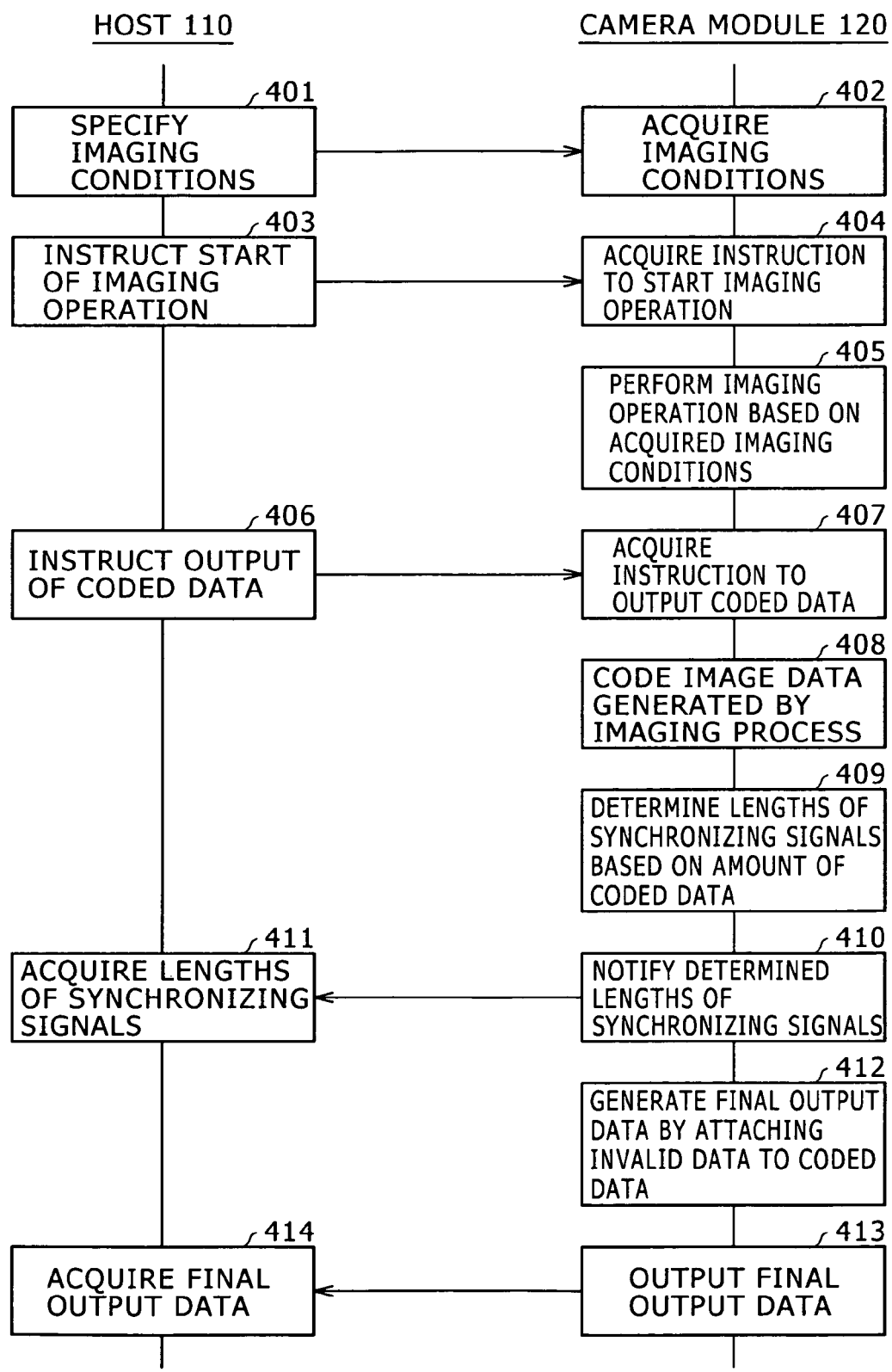
FIG. 5 is a sequence chart illustrating the coded data transmission process if coded data is transmitted from a camera module to the host in the first embodiment of the present disclosure.

FIG. 5 is a sequence chart illustrating the coded data transmission process if coded data is transmitted from the camera module 120 to the host 110 in the first embodiment of the present disclosure. In the example shown in FIG. 5, the relationship between the host 110 and camera module 120 is schematically shown.

First, the host 110 specifies imaging conditions (e.g., image size and exposure time), under which the imaging operation is to be performed, to the camera module 120 (401), and the camera module 120 acquires the imaging conditions specified by the host 110 (402). That is, a control signal for the imaging conditions is output from the host 110 to the camera module 120 via the signal line 332 (401), and the control signal for the imaging conditions is received by the camera module 120 (402).

Next, the host 110 transmits an imaging operation start instruction adapted to start the imaging operation to the camera module 120 (403), and the camera module 120 receives the imaging operation start instruction from the host 110 (404). That is, a control signal for an imaging operation start instruction is output from the host 110 to the camera module 120 via the signal line 332 (403), and the control signal for an imaging operation start instruction is received by the camera module 120 (404).

Next, the camera module 120 performs the imaging process based on the imaging conditions specified by the host 110 (405). That is, the imaging element 220 generates an image signal (image data). The generated image signal is supplied to the signal processing block 240 and stored in the SDRAM 270.

Next, the host 110 transmits a coded data output instruction adapted to output coded data to the camera module 120 (406), and the camera module 120 receives the coded data output instruction from the host 110 (407). That is, a control signal for a coded data output instruction is output from the host 110 to the camera module 120 via the signal line 332 (406), and the control signal for a coded data output instruction is received by the camera module 120 (407).

Next, the camera module 120 generates coded data by coding the image data generated by the imaging process (408). That is, the coded data generation section 241 converts the generated image data into coded data (408).

Next, the camera module 120 determines the lengths of the synchronizing signals (vertical and horizontal synchronizing signals) for the coded data based on the amount of coded data (409). That is, the CPU 230 determines the lengths of the synchronizing signals for the coded data based on the amount of coded data and calculates the amount of data (amount of output data) at the time of output of coded data based on the lengths of the synchronizing signals (409).

Next, the camera module 120 notifies the calculated lengths of the synchronizing signals to the host 110 (410), and the host 110 acquires the lengths of the synchronizing signals from the camera module 120 (411). That is, the CPU 230 outputs the calculated lengths of the synchronizing signals to the coded data output section 243 via the signal line 323 and to the host 110 via the signal line 332 (410). Then, the host 110 acquires the lengths of the synchronizing signals (411).

Next, the camera module 120 generates final output data by attaching invalid data to the generated coded data (412). That is, the invalid data attachment section 242 generates final output data by attaching invalid data to the generated coded data based on the result of comparison between the amount of generated coded data and the amount of output data for the generated coded data (412). It should be noted that when the amount of coded data is the same as the amount of output data, no invalid data is attached to the coded data.

Next, the camera module 120 outputs the generated final output data to the host 110 (413). That is, the coded data output section 243 outputs the final output data to the host 110 based on the lengths of the synchronizing signals (vertical and horizontal synchronizing signals) determined by the CPU 230 (413). Then, the host 110 acquires the final output data (414).

[Examples of Output of Coded Data]

Figure 6A:
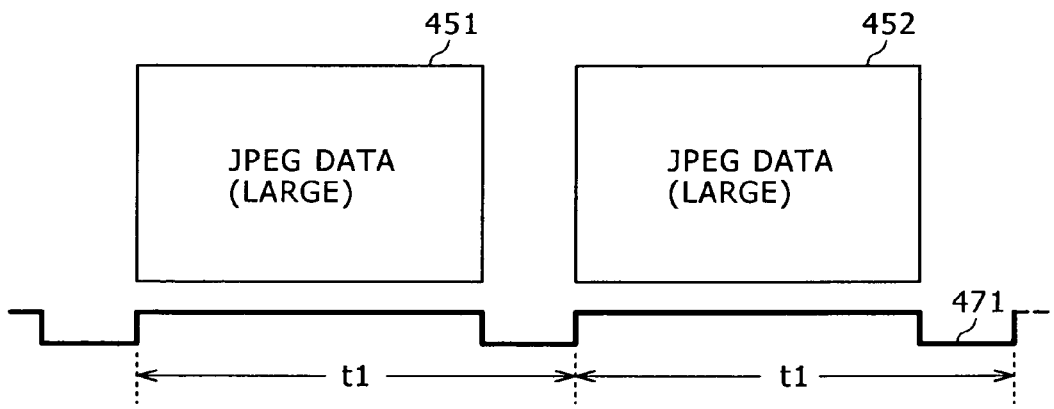
FIGS. 6A to 6C are diagrams schematically illustrating examples of output of coded data generated by the signal processing block in the first embodiment of the present disclosure.
Figure 6B:
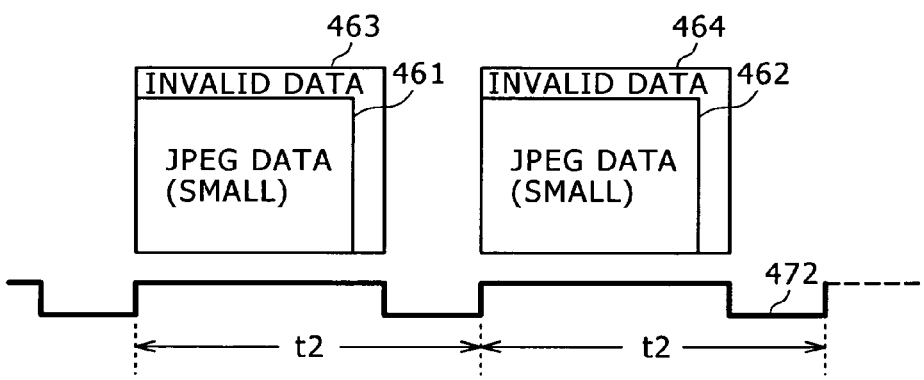
Figure 6C:
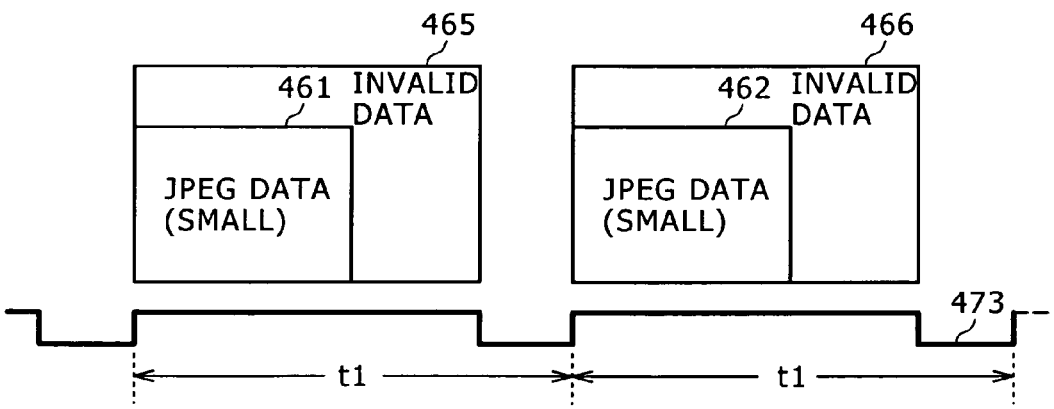

FIGS. 6A to 6C are diagrams schematically illustrating examples of output of coded data generated by the signal processing block 240 in the first embodiment of the present disclosure. That is, FIGS. 6A to 6C illustrate examples of output of JPEG data from the signal processing block 240 to the host 110 via the signal lines 304 to 311.

Further, FIGS. 6A to 6C schematically illustrate the relationship between the amount of JPEG data (JPEG data size) and the time it takes to transmit this JPEG data. More specifically, the horizontal axis represents the time it takes to transmit JPEG data in FIGS. 6A to 6C. Here, waveforms 471 to 473 shown in FIGS. 6A to 6C are those of the vertical synchronizing signal (VSYNC). Further, each of times t1 and t2 shown in FIGS. 6A to 6C represents the time (transmission time) from the beginning of transmission of one piece of JPEG data to the beginning of transmission of a next piece of JPEG data. Still further, FIGS. 6A to 6C schematically illustrate the amounts of JPEG data by the sizes of the rectangles representing pieces of JPEG data 451, 452, 461 and 462. Similarly, FIGS. 6A to 6C schematically illustrate the amounts of invalid data by the sizes of the L shapes representing pieces of invalid data 463 to 466.

FIG. 6A illustrates an example of output of the pieces of JPEG data 451 and 452 that are relatively large in data amount. It should be noted that the pieces of JPEG data 451 and 452 are identically sized with no invalid data attached thereto in FIG. 6A to facilitate the description. In the example shown in FIG. 6A, it takes time t1 to transmit each of the pieces of JPEG data 451 and 452.

FIG. 6B illustrates an example of output of the pieces of JPEG data 461 and 462 that are relatively small in data amount. It should be noted that the pieces of JPEG data 461 and 462 are identically sized with identical pieces of invalid data 463 and 464 attached thereto in FIG. 6B to facilitate the description. In the example shown in FIG. 6B, it takes time t2 to transmit each of the pieces of JPEG data 461 and 462.

FIG. 6C illustrates an example of output of the same pieces of JPEG data 461 and 462 as used in FIG. 6B in related art. The identical pieces of invalid data 465 and 466 are attached respectively to the pieces of JPEG data 461 and 462 in FIG. 6C so that the pieces of JPEG data 461 and 462 are identical in data amount to the pieces of JPEG data 451 and 452 shown in FIG. 6A. Thus, in the example of output in related art, the same amount of data as the pieces of JPEG data 451 and 452 is transmitted. As a result, it takes time t1 to transmit each of the pieces of JPEG data 461 and 462.

The first embodiment of the present disclosure determines the lengths of the synchronizing signals (vertical and horizontal synchronizing signals) according to the amount of JPEG data to be transmitted and transmits the JPEG data according to the lengths of the synchronizing signals as illustrated in FIGS. 6A and 6B. This makes it possible to perform the transmission process properly appropriate to the amount of JPEG data to be transmitted, thus contributing to reduced transmission time. In contrast, it takes the same amount of time to transmit the data in the example of transmission in related art (shown in FIG. 6C) as it does to transmit the JPEG data (JPEG data relatively large in data amount) shown in FIG. 6A, making it difficult to reduce the transmission time.

That is, the first embodiment of the present disclosure allows for efficient transmission of coded data according to the size of coded data. For example, it is probable that, after capturing (shooting) a plurality of images, the user of the mobile phone device 100 may wish to verify the image data generated by the image capture. In this case, if many of the plurality of pieces of image data generated by the image capture are relatively small in data amount, it is possible to reduce the transmission time. This allows for the user of the mobile phone device 100 to quickly verify the image data generated by the image capture.

Further, the amount of final output data acquired by the host 110 can be reduced, thus contributing to reduced capacity of memory used in the host 110 to store image data. Still further, it is possible to reduce invalid data to be transmitted when coded data is transmitted from the camera module 120 to the host 110, thus contributing to reduced transmission time for the invalid data and providing reduced power consumption for the transmission process.

[Configuration Example of an Image File]

Figure 7:
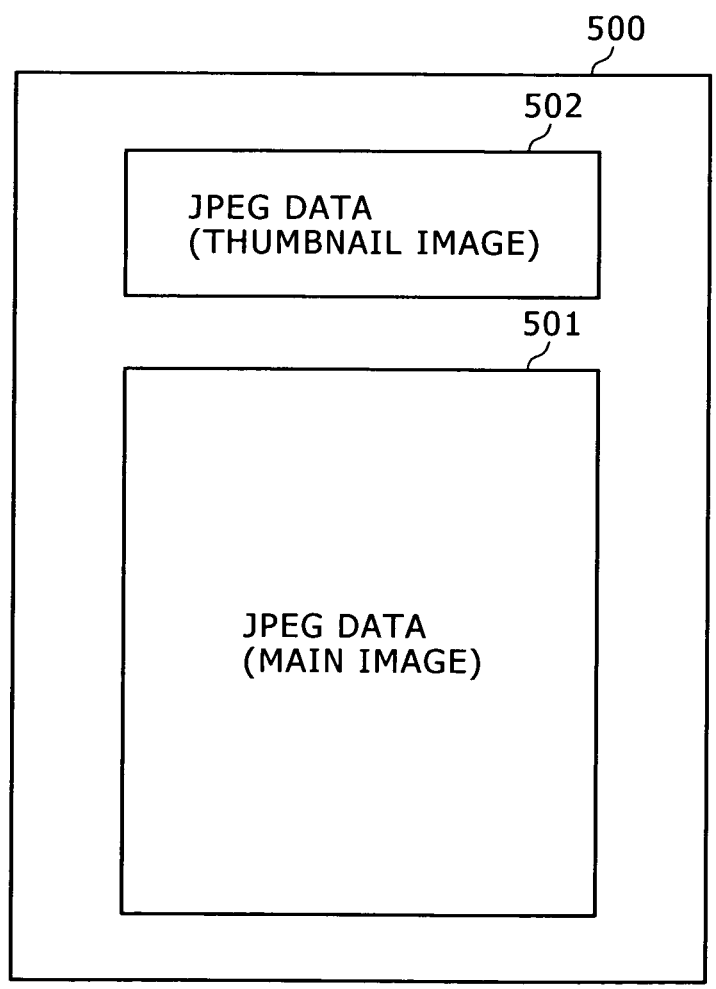
FIG. 7 is a diagram schematically illustrating an example of an image file generated by the mobile phone device in the first embodiment of the present disclosure.

FIG. 7 is a diagram schematically illustrating an example of an image file generated by the mobile phone device 100 in the first embodiment of the present disclosure. The structure of a still image file in JPEG format is schematically illustrated in the example shown in FIG. 7. It should be noted that the image file (JPEG file 500) shown in FIG. 7 is recorded, for example, to a recording media (not shown) incorporated in or attached to the mobile phone device 100.

The JPEG file 500 is a still image file recorded in JPEG format and includes a piece of JPEG data (main image) 501 and another piece of JPEG data (thumbnail image) 502. More specifically, the piece of JPEG data (main image) 501 and piece of JPEG data (thumbnail image) 502 making up the JPEG file 500 are generated by the coded data generation section 241.

The piece of JPEG data (main image) 501 is image information (so-called main image) making up the JPEG file 500. For example, if the shutter button (not shown) provided on the mobile phone device 100 is pressed by the user, the imaging element 220 generates image data which is then compression-coded by the coded data generation section 241, thus generating the piece of JPEG data (main image) 501.

The piece of JPEG data (thumbnail image) 502 is attribute information relating to the JPEG file 500 and a downsized image of the piece of JPEG data (main image) 501. The piece of JPEG data (thumbnail image) 502 is, for example, displayed as a thumbnail image on the index screen adapted to allow selection of the image files recorded on the recording media incorporated in (or attached to) the mobile phone device 100. It should be noted that a screen nail image, position information and date and time information are, for example, included in the JPEG file 500 as attribute information relating to the JPEG file 500. However, the illustration and description thereof are omitted.

Here, of the JPEG data making up the JPEG file 500, the piece of JPEG data (thumbnail image) 502 is smaller in data amount than the piece of JPEG data (main image) 501. Therefore, when the JPEG data is transmitted from the signal processing block 240 to the host 110, it is possible to reduce the transmission time of the piece of JPEG data (thumbnail image) 502 to less than the transmission time of the piece of JPEG data (main image) 501. This example is shown in FIGS. 8A and 8B.

[Examples of Output of Coded Data]

Figure 8A:
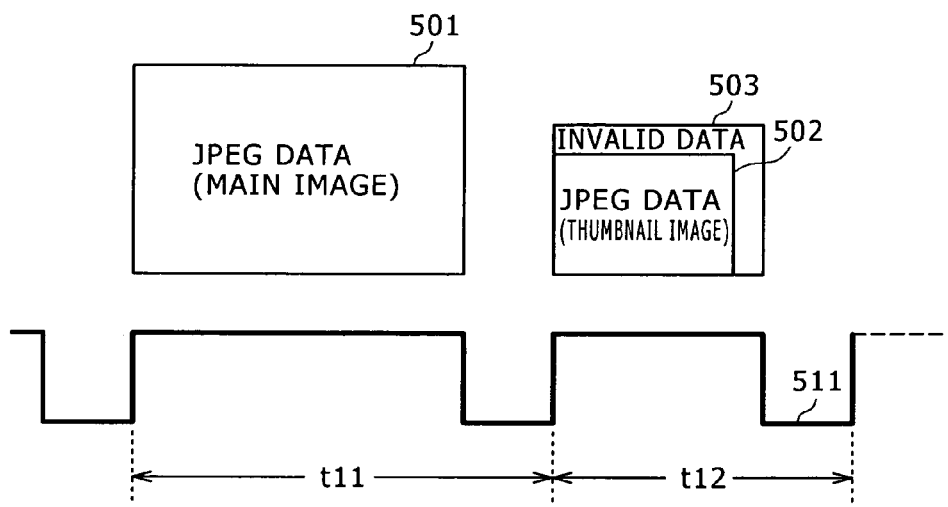
FIGS. 8A and 8B are diagrams schematically illustrating a comparative example of how to output coded data transmitted to the host from the signal processing block in the first embodiment of the present disclosure.
Figure 8B:
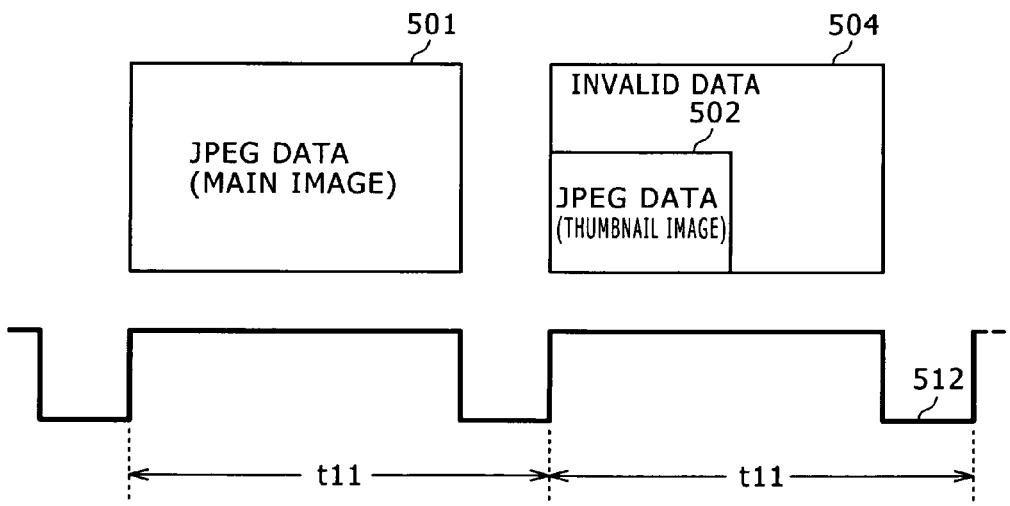

FIGS. 8A and 8B are diagrams schematically illustrating a comparative example of how coded data transmitted to the host 110 is output from the signal processing block 240 in the first embodiment of the present disclosure. FIGS. 8A and 8B illustrate comparative examples in which the piece of JPEG data (main image) 501 and piece of JPEG data (thumbnail image) 502 shown in FIG. 7 are continuously transmitted. It should be noted that, in FIGS. 8A and 8B, the horizontal axis represents the time it takes to transmit JPEG data as in FIGS. 6A to 6C and that waveforms 511 and 512 are those of the vertical synchronizing signal (VSYNC). Further, each of times t11 and t12 shown in FIGS. 8A and 8B represents the time (transmission time) from the beginning of transmission of one piece of JPEG data to the beginning of transmission of a next piece of JPEG data. Still further, FIGS. 8A and 8B schematically illustrate the amounts of JPEG data by the sizes of the rectangles representing pieces of JPEG data 501 and 502. Similarly, FIGS. 8A and 8B schematically illustrate the amounts of invalid data by the sizes of the L shapes representing pieces of invalid data 503 and 504.

FIG. 8A illustrates an example of output in which the lengths of the synchronizing signals (vertical and horizontal synchronizing signals) are determined according to the amount of JPEG data to be transmitted and the JPEG data is output according to the determined lengths of the synchronizing signals. It should be noted that no invalid data is attached to the piece of JPEG data 501 and invalid data 503 is attached to the piece of JPEG data 502 in FIG. 8A to facilitate the description. In the example shown in FIG. 8A, it takes times t11 and t12 respectively to transmit the pieces of JPEG data 501 and 502.

FIG. 8B illustrates an output example in related art in which the same amounts of JPEG data are output regardless of the size of JPEG data to be transmitted. It should be noted that no invalid data is attached to the piece of JPEG data 501 and invalid data 504 is attached to the piece of JPEG data 502 so as to bring the amount of data into equality with that of the piece of JPEG data 501 to facilitate the description. In the example shown in FIG. 8B, it takes time t11 to transmit each of the pieces of JPEG data 501 and 502. Thus, in the output example of related art, the same amount of data as that of the piece of JPEG data 501, relatively large in data amount, is transmitted even when the piece of JPEG data 502, relatively small in data amount, is transmitted. As a result, it takes time t11 to transmit each of the pieces of JPEG data 501 and 502.

As illustrated in FIGS. 8A and 8B, it is possible to reduce the transmission time even when the piece of JPEG data (main image) 501 and piece of JPEG data (thumbnail image) 502 making up the JPEG file 500 are transmitted continuously.

[Operation Example of the Mobile Phone Device]

A description will be given next of the operation of the mobile phone device 100 in the first embodiment of the present disclosure.

[Example of Output of a Piece of Coded Data]

Figure 9:
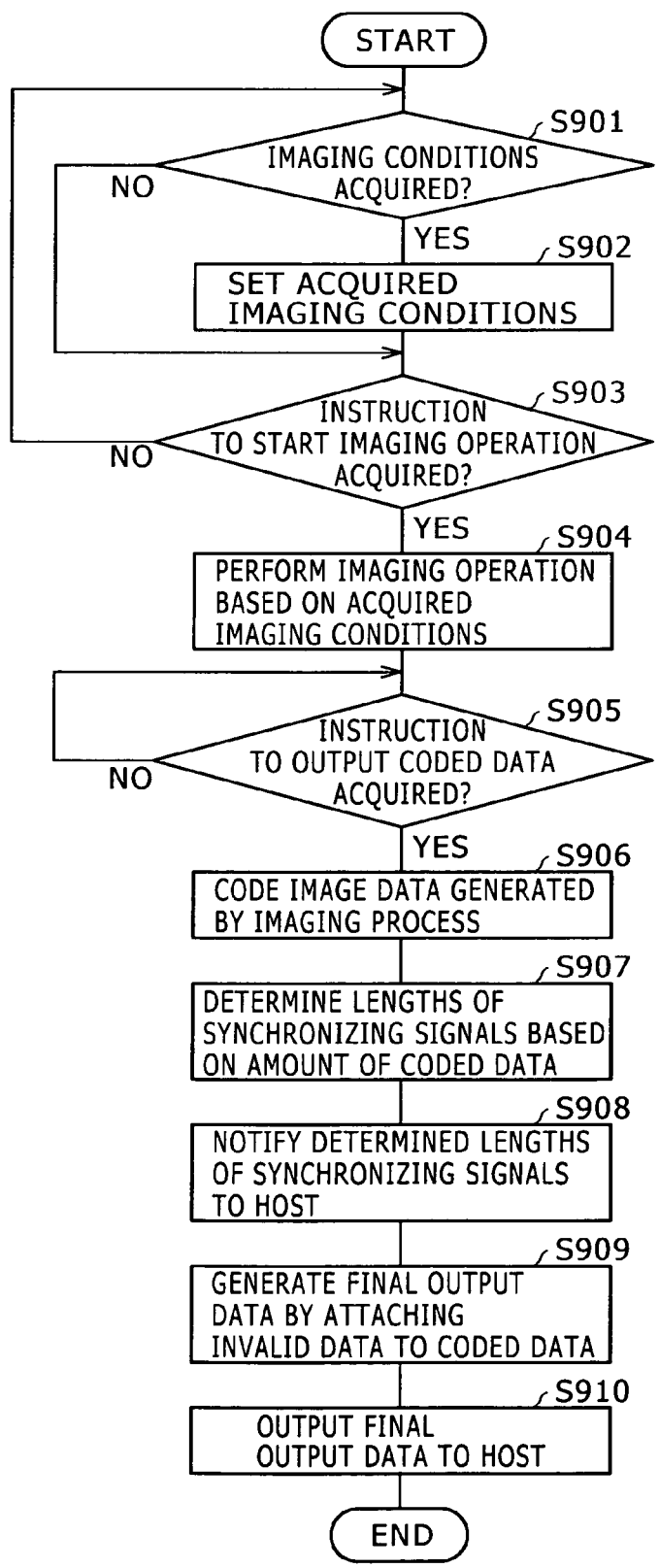
FIG. 9 is a flowchart illustrating an example of steps of coded data output control performed by the camera module in the first embodiment of the present disclosure.

FIG. 9 is a flowchart illustrating an example of steps of coded data output control performed by the camera module 120 in the first embodiment of the present disclosure.

First, it is determined whether the camera module 120 has acquired the imaging conditions from the host 110 (step S901). When the camera module 120 has acquired the imaging conditions, the CPU 230 sets the acquired imaging conditions (step S902). On the other hand, if the camera module 120 has yet to acquire the imaging conditions from the host 110 (step S901), the process proceeds to step S903.

Next, it is determined whether the camera module 120 has acquired an imaging operation start instruction adapted to start the imaging operation from the host 110 (step S903). If the camera module 120 has yet to acquire an imaging operation start instruction, the process returns to step S901. On the other hand, when the camera module 120 has acquired an imaging operation start instruction (step S903), the imaging operation is performed based on the imaging conditions specified by the host 110 (step S904). It should be noted that if the camera module 120 does not acquire the imaging conditions from the host 110 immediately prior to the imaging operation, the imaging conditions acquired last are used. It should be noted that step S904 is an example of the generation step as defined in the appended claims.

Next, it is determined whether the camera module 120 has acquired a coded data output instruction from the host 110 (step S905). If the camera module 120 has yet to acquire a coded data output instruction, the same module 120 continues its monitoring. On the other hand, when the camera module 120 has acquired a coded data output instruction from the host 110 (step S905), the coded data generation section 241 generates coded data by coding the image data generated by the imaging process (step S906). That is, the generated image data is converted into coded data. It should be noted that step S906 is an example of the coding step as defined in the appended claims.

Next, the coded data generation section 241 determines the lengths of the synchronizing signals (vertical and horizontal synchronizing signals) for the coded data based on the amount of coded data (step S907). That is, the lengths of the synchronizing signals are determined based on the amount of coded data, and the amount of data (amount of output data) at the time of output of coded data is calculated based on the lengths of the synchronizing signals.

Next, the CPU 230 notifies the calculated lengths of the synchronizing signals to the host 110 (step S908). That is, the calculated lengths of the synchronizing signals are output to the coded data output section 243 and host 110.

Next, the invalid data attachment section 242 generates final output data by attaching invalid data to the generated coded data (step S909). That is, final output data is generated by attaching invalid data to the coded data based on the result of comparison between the amount of generated coded data and the amount of output data for the generated coded data. It should be noted that when the amount of coded data is the same as the amount of output data, no invalid data is attached to the coded data.

Next, the coded data output section 243 outputs the generated final output data to the host 110 (step S910), thus terminating the operation adapted to control the output of coded data. That is, the final output data is output to the host 110 based on the lengths of the synchronizing signals (vertical and horizontal synchronizing signals) determined by the CPU 230. Then, the host 110 captures the final output data, detects the invalid data attached to the final output data and removes the invalid data from the final output data, thus extracting only the coded data. It should be noted that steps S907 to S910 are an example of the control step as defined in the appended claims.

[Example of Output of a Plurality of Pieces of Coded Data]

An example was shown above in which a piece of coded data was transmitted from the camera module 120 to the host 110. However, the first embodiment of the present disclosure is also applicable when a plurality of pieces of coded data are continuously output (e.g., continuous imaging operation (so-called continuous shooting)). Therefore, a description will be given below of the operation of the mobile phone device 100 when a plurality of pieces of coded data are generated and sequentially output from the camera module 120 to the host 110 with reference to the accompanying drawing.

Figure 10:
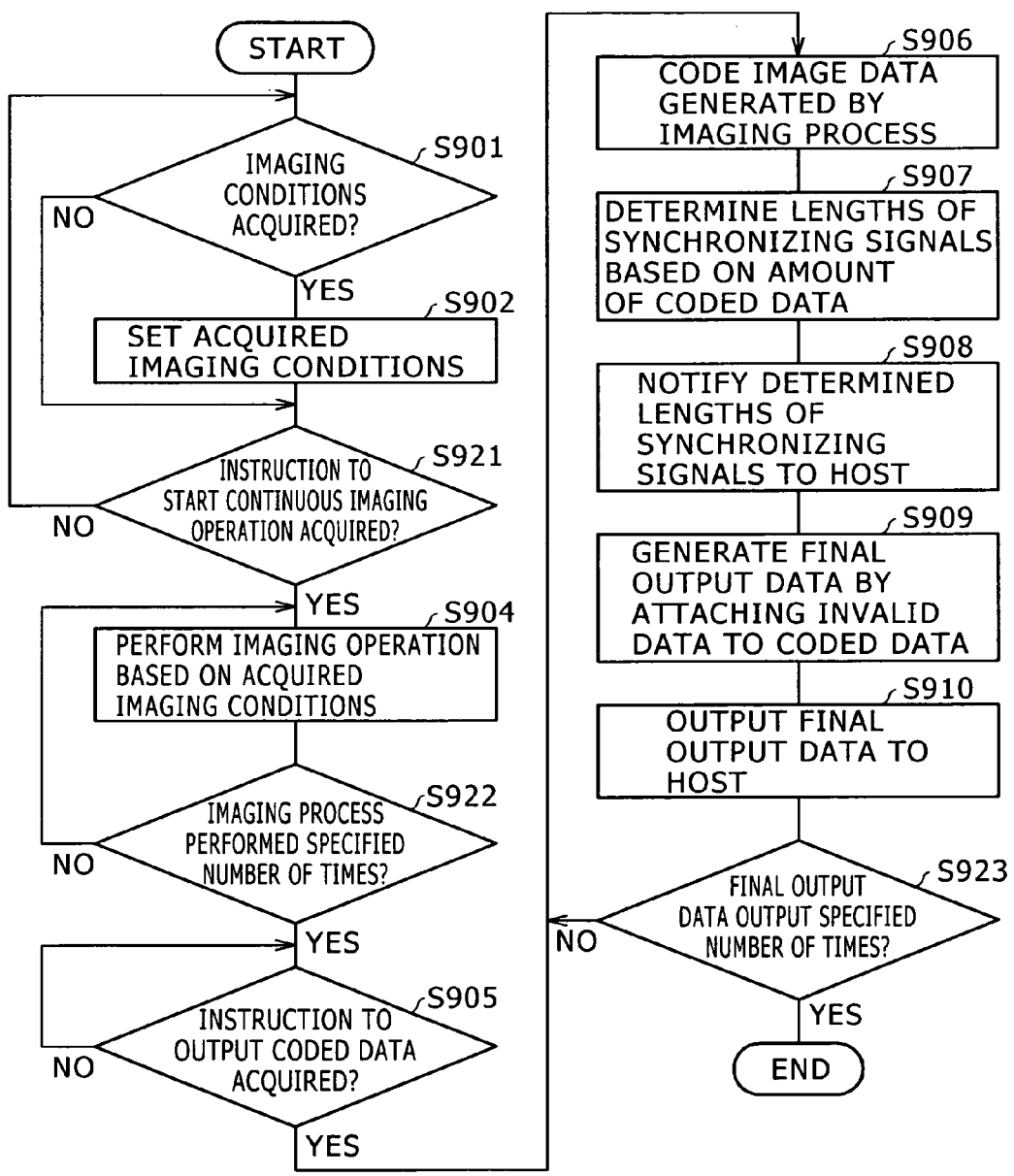
FIG. 10 is a flowchart illustrating an example of steps of coded data output control performed by the camera module in the first embodiment of the present disclosure.

FIG. 10 is a flowchart illustrating an example of steps of coded data output control performed by the camera module 120 in the first embodiment of the present disclosure. This example shows a case in which a plurality of pieces of coded data (e.g., seven pieces of coded data) are continuously generated and sequentially output from the camera module 120 to the host 110. It should be noted that the steps shown here are a modification example of the steps shown in FIG. 9. Therefore, the steps identical to those shown in FIG. 9 are denoted by the same reference numerals, and the description of common features is omitted.

It is determined whether the camera module 120 has acquired a continuous imaging operation start instruction adapted to start the continuous imaging operation from the host 110 (step S921). When the camera module 120 has acquired a continuous imaging operation start instruction, the process proceeds to step S904. On the other hand, if the camera module 120 has yet to acquire a continuous imaging operation start instruction, the process returns to step S901. This continuous imaging operation start instruction is issued, for example, in response to user operation adapted to instruct the start of continuous imaging.

Next, after the imaging process (step S904), it is determined whether the imaging process has been performed the specified number of times (step S922). For example, if the specified number is seven (e.g., continuous shooting of seven images), it is determined whether the imaging process for seven pieces of coded data is complete. The imaging process continues until the imaging process is performed the specified number of times (step S904). When the imaging process is performed the specified number of times (step S922), the process proceeds to step S905.

Further, after the output of final output data to the host 110 (step S910), it is determined whether as many pieces of final output data as the specified number have been output (step S923). For example, if the specified number is seven, it is determined whether seven pieces of final output data have been output. The output of final output data continues until as many pieces of final output data as the specified number are output (steps S906 to S910). When as many pieces of final output data as the specified number are output (step S923), the operation adapted to control the output of coded data is terminated.

<2. Second Embodiment>

In the first embodiment of the present disclosure, an example was shown in which the lengths of the vertical and horizontal synchronizing signals determined for each piece of generated coded data was notified to the host 110. Here, faster data output can be probably achieved, for example, by storing identification information indicating combinations of lengths of the vertical and horizontal synchronizing signals and notifying the host 110 of the identification information of the combination selected from among the stored combinations. In a second embodiment of the present disclosure, therefore, an example will be shown in which identification information indicating the combination of lengths of the vertical and horizontal synchronizing signals is notified to the host 110. It should be noted that the mobile phone device according to the second embodiment of the present disclosure is roughly identical in configuration to the counterpart according to the first embodiment. Therefore, the components common to the first and second embodiments are denoted by the same reference numerals, and the description thereof is omitted.

[Example of a Synchronizing Signal Length Indication Information Table]

FIG. 11 is a diagram illustrating an example of a synchronizing signal length indication information table stored in the host 110 and camera module 120 in the second embodiment of the present disclosure. A synchronizing signal length indication information table 800 shown in FIG. 11 stores identification numbers 801, horizontal synchronizing signals 802 and vertical synchronizing signals 803 in relation to each other. That is, the synchronizing signal length indication information table 800 stores a plurality of combinations of lengths of the vertical and horizontal synchronizing signals. Thus, the second embodiment of the present disclosure is an example in which the synchronizing signal length indication information table 800 is stored in the host 110 and camera module 120 (CPU 230). It should be noted that the CPU 230 is an example of the storage section as defined in the appended claims.

The horizontal synchronizing signals 802 and vertical synchronizing signals 803 indicate the lengths of the synchronizing signals (vertical and horizontal synchronizing signals) used to output final output data from the coded data output section 243 to the host 110.

For example, the CPU 230 selects and determines, based on the amount of generated coded data, the combination of the horizontal and vertical synchronizing signals 802 and 803 best suited as the lengths of the synchronizing signals used to output the coded data to the host 110. Then, the CPU 230 calculates the amount of data (amount of output data) at the time of output of the coded data based on the two values of the horizontal and vertical synchronizing signals 802 and 803 in the determined combination.

For example, the CPU 230 selects and determines, of all the combinations of lengths at which the amount of data identified by the combinations of lengths included in the synchronizing signal length indication information table 800 is equal to or greater than that of the coded data, the lengths whose combination provides the smallest identified amount of data.

Further, the CPU 230 outputs the identification number (identification number 801), associated with the horizontal and vertical synchronizing signals 802 and 803 of the determined combination, to the host 110. Still further, the CPU 230 outputs the values of the horizontal and vertical synchronizing signals 802 and 803 of the selected combination to the coded data output section 243. On the other hand, when acquiring the identification number (identification number 801) from the CPU 230, the host 110 refers to the stored synchronizing signal length indication information table 800. Then, the host 110 captures the final output data using the values of the horizontal and vertical synchronizing signals 802 and 803 associated with the acquired identification number (identification number 801).

Thus, the second embodiment of the present disclosure makes it possible to determine the lengths of the vertical and horizontal synchronizing signals using the synchronizing signal length indication information table 800. Further, only the identification number (identification number 801) associated with the determined horizontal and vertical synchronizing signals is notified to the host 110. This contributes to reduced burden associated with determining and notifying the lengths of the synchronizing signals.

It should be noted that although a mobile phone device was described as an example of the image processing device in the embodiments of the present disclosure, the embodiments of the present disclosure are applicable to other image processing devices and systems. For example, the embodiments of the present disclosure are applicable to a monitoring camera, electronic magnifier, USB (Universal Serial Bus) camera system, PC camera system and so on. It should be noted that an electronic magnifier is an electronic device incorporating an imaging element and designed to display, on its display section, an enlarged view of the image (e.g., text, graphics) generated by the imaging element. Further, a USB camera system is an image processing system that includes, for example, a USB camera and image processing device (e.g., PC or television set). Still further, a PC camera system is an image processing system that includes, for example, a PC (personal computer) incorporating a camera or to which a camera is attached. That is, the present disclosure is applicable to an image processing system operable to transmit coded data between an acquisition device (e.g., PC) adapted to acquire coded data and control the output or recording of the coded data and other image processing device (e.g., imaging device).

It should be noted that the embodiments of the present disclosure are merely illustrative of manners in which to carry out the present disclosure. As has been explicitly pointed out in the embodiments of the present disclosure, there are correspondences between the features of the embodiments of the present disclosure and the specific features of the disclosure set forth in the claims. Similarly, there are correspondences between the specific features of the disclosure set forth in the claims and the identically named features of the embodiments of the present disclosure. It should be noted, however, that the present disclosure is not limited to the embodiments but may be carried out by modifying the embodiments in various manners without departing from the scope of the present disclosure.

On the other hand, the process steps described in the embodiments of the present disclosure may be considered a method that includes the series of steps. Alternatively, the process steps may be considered a program for causing a computer to perform the series of steps or a storage media adapted to store the program. A CD (Compact Disc), MD (MiniDisc), DVD (Digital Versatile Disk), memory card or Blu-ray disk (registered trademark) may be, for example, used as a storage media.

The present disclosure contains subject matter related to that disclosed in Japanese Priority Patent Application JP 2010-233320 filed in the Japan Patent Office on Oct. 18, 2010, the entire content of which is hereby incorporated by reference.

What is claimed is:

1. An image processing device comprising:
an acquisition section adapted to acquire coded data and control the output or recording of the coded data;
a generation section adapted to generate image data;
a coding section adapted to generate the coded data by coding the generated image data in response to an output request from the acquisition section;
an output section adapted to output the generated coded data to the acquisition section; and
a control section adapted to determine, based on an amount of the generated coded data, the sizes of vertical and horizontal synchronizing signals used to output the coded data to the acquisition section, notify the determined sizes to the acquisition section, and control the output section to output the coded data according to the vertical and horizontal synchronizing signals of the determined sizes after the notification,
wherein the control section determines the sizes of the vertical and the horizontal synchronizing signals by selecting a preset combination, from a plurality of preset combinations of sizes of the vertical and horizontal synchronizing signals, having the smallest sizes of the vertical and horizontal synchronizing signals capable of outputting the amount of generated coded data.

2. The image processing device of claim 1, wherein the generation section generates the image data by capturing an image of a subject.

3. The image processing device of claim 2, wherein
the generation section generates a plurality of pieces of image data that are successive in time series by continuously capturing images of the subject,
the coding section generates the plurality of pieces of coded data by sequentially coding the plurality of pieces of generated image data, and
the control section determines the sizes of the vertical and horizontal synchronizing signals for each piece of the generated coded data, notifies the determined sizes for each piece of the generated coded data to the acquisition section and controls the output of each piece of the coded data to the acquisition section according to the vertical and horizontal synchronizing signals of the notified sizes.

4. The image processing device of claim 1, wherein the coding section generates the coded data by coding the generated image data according to the JPEG, which stands for Joint Photographic Experts Group, scheme.

5. The image processing device of claim 4, wherein
the coding section generates coded data for a main image making up a JPEG file and coded data for a thumbnail image making up the JPEG file based on the generated image data, and
the control section determines the sizes of the vertical and horizontal synchronizing signals for each piece of the coded data making up the JPEG file, notifies the determined sizes for each piece of the coded data to the acquisition section and controls the output of each piece of the coded data to the acquisition section according to the vertical and horizontal synchronizing signals of the notified sizes.

6. The image processing device of claim 1, wherein the control section determines, of all the sizes of the vertical and horizontal synchronizing signals at which the amount of data identified by the sizes of the vertical and horizontal synchronizing signals is equal to or greater than that of the generated coded data, the combination of the smallest sizes.

7. The image processing device of claim 6, further comprising:
an invalid data attachment section adapted to attach invalid data to the generated coded data so as to bring the amount of data into equality with that identified by the determined sizes,
wherein the control section controls the output section to output the generated output data according to the determined sizes after the notification.

8. The image processing device of claim 1, further comprising:
a storage section adapted to store the plurality of preset combinations of the sizes of the vertical and horizontal synchronizing signals,
wherein the control section determines, of all the plurality of preset combinations of the sizes at which the amount of data identified by the combination of sizes is equal to or greater than that of the generated coded data, the sizes whose combination provides the smallest identified amount of data.

9. The image processing device of claim 1, wherein the control section determines a fixed size as the size of the horizontal synchronizing signal and a size commensurate with the amount of the generated coded data as the size of the vertical synchronizing signal.

10. The image processing device of claim 1, further comprising an invalid data attachment section adapted to compare the amount of the generated coded data with an amount of output data calculated based on the determined sizes of the vertical and horizontal synchronizing signals.

11. The image processing device of claim 1, wherein the control section is further adapted to determine the sizes of the vertical and horizontal synchronizing signals by comparing the amount of the generated coded data with an amount of data corresponding to each of the plurality of preset combinations of the sizes of the vertical and horizontal synchronizing signals.

12. The image processing device of claim 1, wherein the determined sizes of the vertical and the horizontal synchronizing signals is varied with a change in an amount of the generated coded data.

13. An image processing system comprising:
an acquisition device adapted to acquire coded data and control the output or recording of the coded data; and
an image processing device, the image processing device including
a generation section adapted to generate image data,
a coding section adapted to generate the coded data by coding the generated image data in response to an output request from the acquisition device,
an output section adapted to output the generated coded data to the acquisition device, and
a control section adapted to determine, based on an amount of the generated coded data, the sizes of vertical and horizontal synchronizing signals used to output the coded data to the acquisition device, notify the determined sizes to the acquisition device, and control the output section to output the coded data according to the vertical and horizontal synchronizing signals of the determined sizes after the notification,
wherein the control section determines the sizes of the vertical and the horizontal synchronizing signals by selecting a preset combination, from a plurality of preset combinations of sizes of the vertical and horizontal synchronizing signals, having the smallest sizes of the vertical and horizontal synchronizing signals capable of outputting the amount of generated coded data.

14. An image processing method comprising:
generating image data;
generating coded data by coding the generated image data in response to an output request from an acquisition section adapted to acquire the coded data and control the output or recording of the coded data; and
determining, based on an amount of the generated coded data, the sizes of vertical and horizontal synchronizing signals used to output the coded data to the acquisition section, notifying the determined sizes to the acquisition section, and controlling an output section to output the coded data according to the vertical and horizontal synchronizing signals of the determined sizes after the notification,
wherein the sizes of the vertical and the horizontal synchronizing signals determined by selecting a preset combination, from a plurality of preset combinations of sizes of the vertical and horizontal synchronizing signals, having the smallest sizes of the vertical and horizontal synchronizing signals capable of outputting the amount of generated coded data.

15. A non-transitory computer-readable medium having stored thereon, a set of computer-executable instructions for causing a computer to perform:
generating image data;
generating coded data by coding the generated image data in response to an output request from an acquisition section adapted to acquire the coded data and control the output or recording of the coded data; and
determining, based on an amount of the generated coded data, the sizes of vertical and horizontal synchronizing signals used to output the coded data to the acquisition section, notifying the determined sizes to the acquisition section, and controlling an output section to output the coded data according to the vertical and horizontal synchronizing signals of the determined sizes after the notification,
wherein the sizes of the vertical and the horizontal synchronizing signals determined by selecting a preset combination, from a plurality of preset combinations of sizes of the vertical and horizontal synchronizing signals, having the smallest sizes of the vertical and horizontal synchronizing signals capable of outputting the amount of generated coded data.

16. An image processing device comprising:
an acquisition section adapted to acquire coded data and control the output or recording of the coded data;
a generation section adapted to generate image data;
a coding section adapted to generate the coded data by coding the generated image data in response to an output request from the acquisition section;
an output section adapted to output the generated coded data to the acquisition section;
a control section adapted to determine, based on an amount of the generated coded data, the sizes of vertical and horizontal synchronizing signals used to output the coded data to the acquisition section, notify the determined sizes to the acquisition section, and control the output section to output the coded data according to the vertical and horizontal synchronizing signals of the determined sizes after the notification; and a storage section adapted to store a plurality of preset combinations of the sizes of the vertical and horizontal synchronizing signals with corresponding identification numbers in association to each other in an information table, wherein the control section determines the sizes of the vertical and the horizontal synchronizing signals by selecting a preset combination, from the plurality of preset combinations of the sizes of the vertical and horizontal synchronizing signals, having the smallest sizes of the vertical and horizontal synchronizing signals capable of outputting the amount of generated coded data.

17. The image processing device of claim 16, wherein the control section is further adapted to notify the identification number, associated with the determined combination of the sizes of the vertical and horizontal synchronizing signals, to the acquisition section.

\* \* \* \* \*